(12) United States Patent
Buchholz

(10) Patent No.: US 7,954,616 B2
(45) Date of Patent: Jun. 7, 2011

(54) FLUID FRICTION CLUTCH

(75) Inventor: Thomas Buchholz, Stockach (DE)

(73) Assignee: BorgWarner Inc., Auburn Hills, MI (US)

( * ) Notice: Subject to any disclaimer, the term of this patent is extended or adjusted under 35 U.S.C. 154(b) by 487 days.

(21) Appl. No.: 11/916,995

(22) PCT Filed: Feb. 17, 2006

(86) PCT No.: PCT/EP2006/001434
§ 371 (c)(1),
(2), (4) Date: Sep. 22, 2008

(87) PCT Pub. No.: WO2006/131157
PCT Pub. Date: Dec. 14, 2006

(65) Prior Publication Data
US 2009/0127051 A1 May 21, 2009

(30) Foreign Application Priority Data

Jun. 9, 2005 (EP) .................................... 05012408

(51) Int. Cl.
*F16D 35/02* (2006.01)
(52) U.S. Cl. ..................................... 192/58.61; 192/58.7
(58) Field of Classification Search ............... 192/58.61, 192/58.7
See application file for complete search history.

(56) References Cited

U.S. PATENT DOCUMENTS

| | | | | |
|---|---|---|---|---|
| 3,458,020 A | * | 7/1969 | Lutz ........................... | 192/58.62 |
| 3,688,884 A | * | 9/1972 | Perrin et al. ................ | 192/58.63 |
| 4,086,990 A | * | 5/1978 | Spence ....................... | 192/58.68 |
| 6,026,943 A | * | 2/2000 | Fuchs et al. ................ | 192/58.61 |
| 6,408,621 B1 | * | 6/2002 | Moser et al. ................ | 60/337 |

FOREIGN PATENT DOCUMENTS

DE 19749342 A1 * 6/1999
EP 0936371 A1 * 8/1999

* cited by examiner

*Primary Examiner* — Richard M. Lorence

(57) ABSTRACT

A fluid friction clutch with improved fluid pumping system. A scraping member is provided adjacent the clutch plate and has a duct which communicates with the reservoir chamber.

18 Claims, 3 Drawing Sheets

FLUID FRICTION CLUTCH

TECHNICAL FIELD

The present invention relates to fluid friction clutches and more particularly to fluid friction clutches with an improved fluid pumping system.

BACKGROUND OF THE INVENTION

The invention relates to a fluid friction clutch having a housing and having a clutch plate which is arranged so as to be rotatable relative to the housing and is rotationally fixedly arranged on an end of a shaft. The shaft is mounted centrally within the housing and supports, at its other end, an active element which is to be driven by the clutch. The clutch has a working chamber which can be pressurized with clutch fluid and is formed between the housing and the clutch plate. The clutch also has a reservoir chamber, which is formed in the housing, for the clutch fluid. A supply duct leads from the reservoir chamber to the working chamber. A back-pumping system returns the clutch fluid from the working chamber to the reservoir chamber. A valve arrangement positioned in the supply duct controls the clutch fluid which is supplied to the working chamber.

In a clutch of said type, the transmission of torque is dependent on the quantity of clutch fluid situated in the working chamber. If a small amount of fluid is situated in the working chamber, then there is a comparatively large degree of slip between the primary and the secondary side, which slip decreases with increasing filling of the working chamber. The rotational speed of the active element changes correspondingly. In order to ensure a constant rotational speed, that is to say a stable operating point, of the secondary side, the relative volume flow rates of the clutch fluid into and out of the working chamber should be equal regardless of the rotational speed of the primary side. The design of the pump system for the clutch fluid therefore has a decisive influence on the operational stability of the clutch.

In the case of a clutch of the type described above and shown in U.S. Pat. No. 6,026,943, a scraping element is arranged in the working chamber between the primary side and the secondary side, which scraping element is part of a dynamic-pressure pump. The supply flow of clutch fluid into the working chamber is controlled by means of a valve arranged in the supply line. Once clutch fluid passes into the working chamber, the secondary side is driven and the relative speed between the primary and secondary sides is reduced. This has the result that the dynamic pressure at the scraping element falls and the effectiveness of the pump is reduced. A feedback of external influences on the secondary-side active element can now lead, depending on the type of influence, to the rotational speed of the secondary side increasing or decreasing with unchanged rotational speed of the primary side. The relative speed and therefore the dynamic pressure at the scraping element is correspondingly varied. In this known clutch, this leads to a drift away from the operating point, and the transmission of torque is unstable.

It is an object of the present invention to provide a fluid friction clutch of the type specified above, but in which a predefined nominal rotational speed can be maintained in a stable fashion under all circumstances.

SUMMARY OF THE INVENTION

According to the invention, the housing is connected to a drive element which is arranged to be rotatable relative to a stationary clutch member and forms the primary side of the clutch. Clutch fluid flowing from the reservoir chamber, through the supply duct which runs substantially radially outward from the reservoir chamber, to the working chamber as the driven housing rotates. A radial gap is formed between the housing and the outer edge of the clutch plate. The back-pumping system comprises a scraping element, which is arranged on the stationary clutch member at that side of the clutch plate which faces away from the working chamber. The scraping element has a duct which communicates with the reservoir chamber. As a result of this structure, the dynamic pressure and therefore the pump power when pumping the clutch fluid back is not influenced by the relative speed of the primary and secondary sides. The degree of clutch engagement is therefore stable under all circumstances, and there is no drift from a nominal value.

The housing has a cover which engages axially and radially over the clutch plate. This facilitates the assembly of the clutch and permits access during servicing and repair work.

In one preferred embodiment of the invention, the scraping element has, in its radially outer region, an accumulation edge or wall for the clutch fluid, at which the duct which communicates with the reservoir chamber opens out.

The drive element for the housing is advantageously embodied as a pulley which is connected, preferably screwed, to the housing.

The radially outer regions of the cover and of the clutch plate are situated Opposite one another and spaced apart. The regions have profiles which engage into one another, and the working chamber is delimited substantially by the profiled regions of the housing and of the clutch plate. This forms a meandering or zig-zag-shaped flow path for the clutch fluid. This enlarges the effective area of the working chamber and improves the torque transmission. In order to control the quantity of clutch fluid entering into the working chamber, the valve arrangement which is arranged in the supply duct comprises an electromagnetic proportional valve. Said valve can have a valve body which can be actuated by means of an axially concentric annular coil which is arranged on the stationary clutch member.

In a further embodiment of the invention, the stationary clutch member has a flange and a hollow cylindrical part which extends axially from said flange. The shaft member supports the clutch plate and the active element extending through the hollow cylindrical member is rotatably mounted in the cylindrical member, preferably by means of at least one rolling bearing. In addition, the housing has a central passage opening through which the hollow cylindrical member extends. The housing is rotatably mounted on the hollow cylindrical member, preferably by means of at least one rolling bearing.

The active element for the clutch can be, for example, a fan wheel of a cooler fan, a water pump wheel, an oil pump wheel, a generator rotor, a compressor rotor, or the like.

Preferred uses of the clutch according to the invention takes place in an auxiliary unit of an engine, preferably of an internal combustion engine, in particular relative to a cooler fan, a generator, a water pump, an oil pump, an air-conditioning compressor, or the like.

The invention is explained in more detail below on the basis of an exemplary embodiment which is illustrated schematically in the drawings. The invention is not to be limited to the exemplary embodiment, but is intended to cover all embodiments which would be recognized by persons of ordinary skill in the art and which fall within the scope of the appended claims.

DESCRIPTION OF THE PREFERRED EMBODIMENTS

Figure 1:
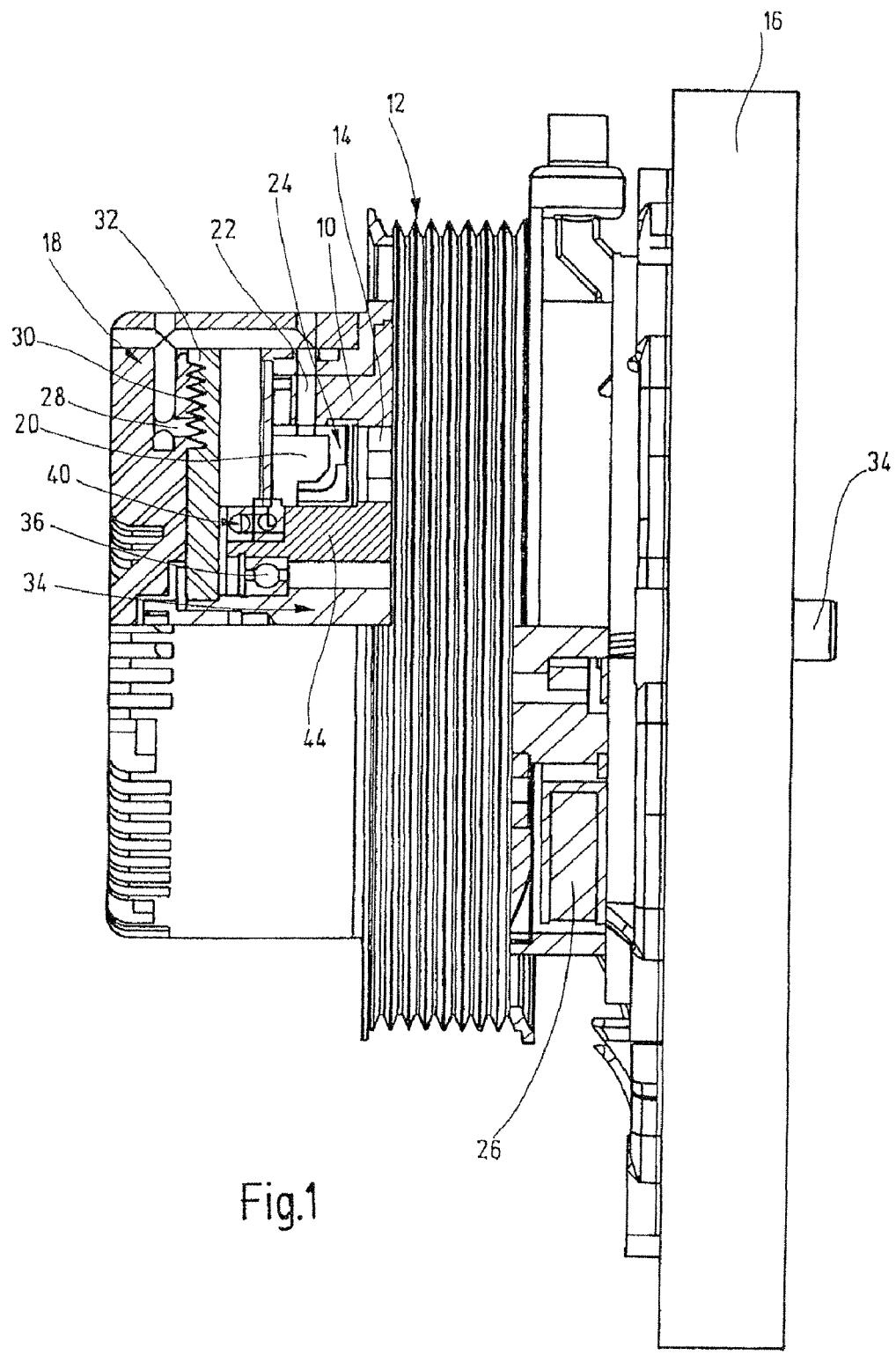
FIG. 1 shows a partially sectioned side view of a fluid friction clutch.
Figure 2:
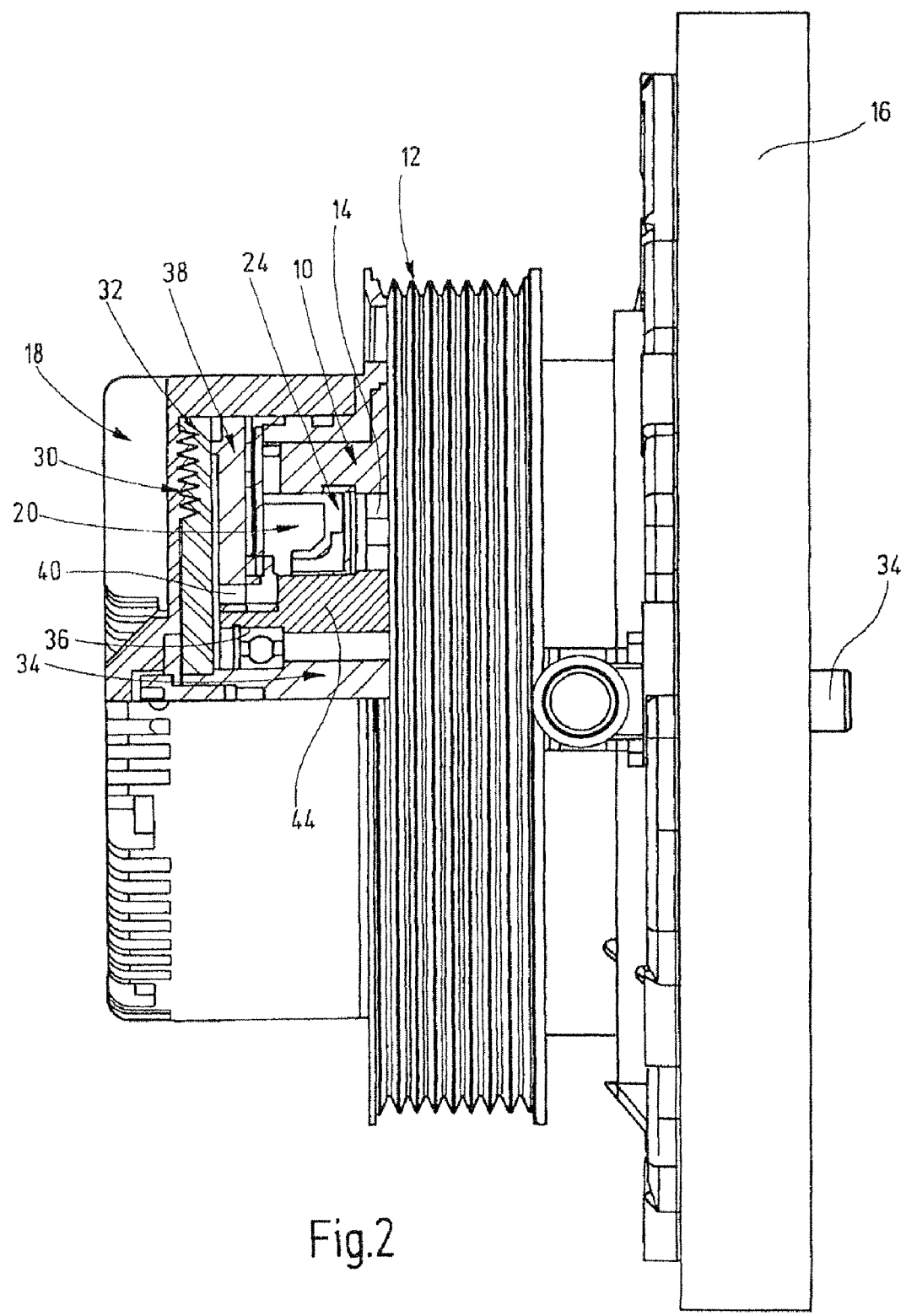
FIG. 2 shows the clutch as per FIG. 1 in a partially sectioned plan view.

The clutch illustrated in FIGS. 1 and 2 has a housing with a housing body 10 and a housing cover 18. The housing body 10 supports a drive disk 12 which is driven by means of a poly-V-belt (not illustrated). The housing is rotatably arranged, by means of a bearing 14, on a stationary clutch member 16 which is, for example, fastened to an engine block (not shown). The cover 18 engages radially and partially axially over the housing body 10 and is fastened, for example screwed, thereto. Also situated in the housing is a reservoir chamber 20 for clutch fluid, for example, silicone oil. The reservoir chamber is connected to a supply duct 22 which leads radially outward, with it being possible for the passage cross section to the supply duct to be varied by means of a valve body 24. The valve body 24 is part of an electromagnetic valve arrangement and is actuated by means of an annular coil 26. The coil 26 is arranged on the stationary clutch part 16 and concentrically surrounds a hollow cylindrical part 44 of the stationary clutch part 16. The supply duct 22 extends further, initially axially, and then radially inward through the cover 18, where said supply duct 22 opens out via a supply opening 28 into the working chamber 30. The working chamber 30 is formed on the one hand by a radially outer region, which is provided with a sawtooth profile, of the cover 18, and on the other hand by a region of a clutch plate 32, which region is arranged such that it is situated opposite said radially outer region of the cover 18 and has a complementary profile. The clutch plate 32 is seated on a shaft 34 and is rotatably mounted by means of two bearings, of which only the one bearing 36 is illustrated, in a central opening of the stationary clutch part 16. Seated on the free end of the shaft 34 is an active element (not illustrated in any more detail) which can, for example, be a water or oil pump wheel.

A gap through which the clutch fluid can pass remains between the outer edge of the clutch plate 32 and the cover 18. At the rear side of the clutch plate 32 is provided a scraping element 38 which is arranged on the stationary clutch part and against which the clutch fluid which passes through the gap accumulates. The scraping element 38 (FIG. 2) has a radially running duct 40 which communicates with the reservoir chamber 20 and through which the clutch fluid passes back into the reservoir chamber 20.

Figure 3:
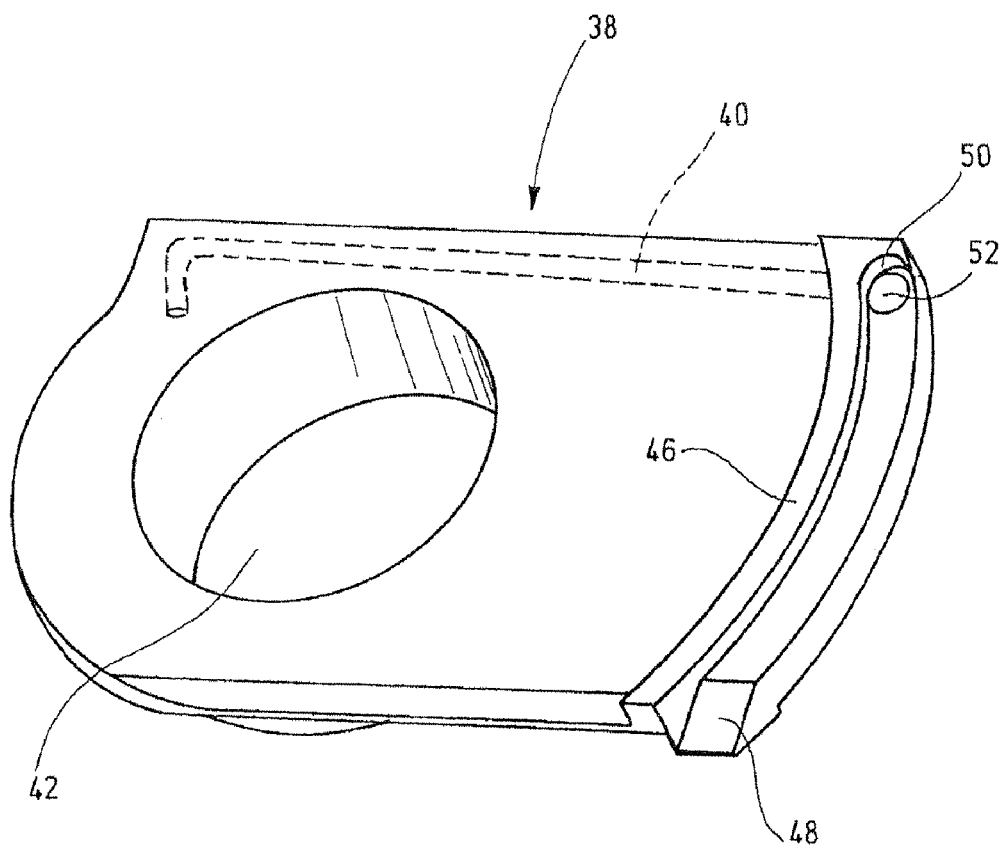
FIG. 3 shows a perspective view of a scraping element, which is arranged on the rear side of the clutch plate, for clutch fluid.

FIG. 3 shows a perspective view of that side of the scraping element 38 which faces toward the clutch plate 32. The scraping element has an approximately slab-shaped design with a passage opening 42 for the hollow cylindrical part 44 (FIGS. 1 and 2) of the stationary clutch part 16. The scraping element 38 extends radially to the cover 18, but without bearing against the latter, so that the cover 18 together with the housing body 10 can rotate freely with respect to the scraping element 38. Spaced apart from its outer edge, the scraping element 38 has a web 46 which, together with the clutch plate 32 and the inner wall of the cover 18, forms a duct for the clutch fluid. The inlet opening of said duct is enlarged by an inclined face 48, while the web 46 at the end of the duct forms an accumulation edge 50. Situated here is an inlet opening 52 to the duct 40 which runs through the interior of the scraping element, which duct 40 opens out at its other end into the reservoir chamber 20.

In operation of the clutch, the housing 10, 18 is set in rotation by means of the drive disk 12. A centrifugal force acts on the clutch fluid situated in the reservoir chamber, which centrifugal force, when the valve body 24 is in a corresponding open position, forces the fluid into the supply duct 22. The fluid flows through the duct in the cover 18 and passes via the supply opening 28 into the working chamber 30. Shear forces act in the fluid, which shear forces drive the clutch plate 32, as a result of which the active element which is seated on the common axle 34 is likewise set in rotation. Since a centrifugal force also acts on the fluid in the working chamber 30, said fluid flows through the radial gap between the clutch plate 32 and the cover 18 to the rear side of the clutch plate 32, where said fluid accumulates at the duct of the scraping element 38 and flows via its duct back into the reservoir chamber 20. The fluid circuit is thereby closed.

Since the scraping element 38 is in a rest position with respect to the clutch plate 32, with increasing rotational speed of the clutch plate 32, the dynamic pressure at the scraping element 38 and therefore its pumping power increases. With corresponding design, the scraping element 38 can fundamentally also be mounted in a floating manner and rotate in the housing 10, 18. For the occurrence of the action according to the invention, however, there should be a considerable rotational speed difference between the scraping element 38 and the clutch plate 32, which rotational speed difference ensures a rising dynamic pressure with increasing rotational speed of the clutch plate 32.

The generated dynamic pressure, which is proportional to the rotational speed of the clutch plate, is therefore a regulating variable which has a stabilizing effect on the system. If a change in rotational speed of the active element is to be initiated by means of a variation of the supply of clutch fluid into the working chamber 20, for example, a reduction in rotational speed by virtue of the supply being reduced by means of the valve, then the clutch plate 32 which is still rotating at relatively high speed imparts a high dynamic pressure at the scraping element 38 and therefore a high return rate of fluid into the reservoir chamber 20. In this manner, the quantity of fluid in the working chamber 30 rapidly falls, and the drive force transmitted to the clutch plate correspondingly falls. The clutch can therefore react quickly to activations.

In summary, the following is to be noted: the invention relates to a fluid friction clutch having a housing 10, 18 and having a clutch plate 32 which is arranged so as to be rotatable relative to the housing 10 and is rotationally fixedly arranged on an end of a shaft 34 which is mounted centrally within the housing. The shaft 34 supports, at its other end, an active element which is to be driven by the clutch. with A working chamber 30 which can be pressurized with clutch fluid is provided between the housing 10, 18 and the clutch plate 32. A reservoir chamber 20, is provided in the housing 10, 18, for the clutch fluid. A supply duct 22 leads from said reservoir chamber 20 to the working chamber 30, and has a back-pumping system for returning the clutch fluid from the working chamber 30 to the reservoir chamber 20. A valve arrangement controls the clutch fluid which is supplied to the working chamber 30 and is arranged in the supply duct 22. In order to maintain a predefined nominal rotational speed in a reliable manner under all conditions, the housing 10, 18 is connected to a drive element 12, and arranged so as to be rotatable relative to a stationary clutch part 16 and forms the primary side of the clutch. The clutch fluid flows from the reservoir chamber 20, through the supply duct 22 which runs substantially radially outward from the latter, to the working chamber 30 as the driven housing 10, 18 rotates. A radial gap is formed between the housing 10, 18 and the outer edge of the clutch plate 32, and the back-pumping system includes a scraping element 38, which is arranged on the stationary clutch part 16 at that side of the clutch plate 32 which faces away from the working chamber 30, for the clutch fluid. The scraping element 38 has a duct 40 which communicates with the reservoir chamber 20.

The invention claimed is:

1. A fluid friction clutch having a housing and having a clutch plate which is arranged so as to be rotatable relative to the housing and is rotationally fixedly arranged on an end of a shaft which is mounted centrally within the housing, which shaft supports, at its other end, an active element which is to be driven by the clutch, with a working chamber which can be pressurized with clutch fluid being formed between the housing and the clutch plate, having a reservoir chamber, which is formed in the housing, for the clutch fluid, and having a supply duct which leads from said reservoir chamber to the working chamber, and having a back-pumping system for returning the clutch fluid from the working chamber to the reservoir chamber with a valve arrangement for controlling the clutch fluid which is supplied to the working chamber being arranged in the supply duct characterized in that the housing is connected to a drive element, is arranged so as to be rotatable relative to a stationary clutch part and forms the primary side of the clutch, with clutch fluid flowing from the reservoir chamber, through the supply duct which runs substantially radially outward from the latter, to the working chamber as the driven housing rotates, in that a radial gap is formed between the housing and the outer edge of the clutch plate, and in that the back-pumping system comprises a scraping element, which is arranged on the stationary clutch part at that side of the clutch plate which faces away from the working chamber, for the clutch fluid, which scraping element has an accumulation edge member and a duct, said duct opening in said accumulation edge member and in communication with the reservoir chamber.

2. The clutch as claimed in claim 1, wherein said housing has a housing body and a cover which engages axially and radially over the clutch plate.

3. The clutch as claimed in claim 1, wherein said drive element for the housing is embodied as a pulley.

4. The clutch as claimed in claim 3, wherein said pulley is connected to the housing.

5. The clutch as claimed in claim 1, wherein the radially outer regions, which are situated opposite one another with a spacing, of the cover and of the clutch plate have profiles which engage into one another.

6. The clutch as claimed in claim 5, wherein said working chamber is delimited substantially by the profiled regions of the cover and of the clutch plate.

7. The clutch as claimed in claim 1, wherein said valve arrangement which is arranged in the supply duct comprises an electromagnetic proportional valve.

8. The clutch as claimed in claim 7, wherein said electromagnetic propotional valve has a valve body which can be actuated by means of an axially concentric annular coil which is arranged on the stationary clutch part.

9. The clutch as claimed in claim 1, wherein said stationary clutch part has a flange and a hollow cylindrical part which extends axially from said flange.

10. The clutch as claimed in claim 9, wherein said shaft which supports the clutch plate and the active element extends through the hollow cylindrical part and is rotatably mounted in the latter by means of at least one rolling bearing.

11. The clutch as claimed in claim 9, wherein said housing has a central passage opening through which the hollow cylindrical part extends, and in that the housing is rotatably mounted on the hollow cylindrical part by means of at least one rolling bearing.

12. The clutch as claimed in claim 1, wherein said active element is embodied as a fan wheel of a cooler fan, as a water pump wheel, as an oil pump wheel, as an oil pump wheel, as a generator rotor or as a compressor rotor.

13. A fluid friction clutch having a housing and having a clutch plate which is arranged so as to be rotatable relative to the housing and is rotationally fixedly arranged on an end of a shaft which is mounted centrally within the housing, which shaft supports, at its other end, an active element which is to be driven by the clutch, with a working chamber which can be pressurized with clutch fluid being formed between the housing and the clutch plate, having a reservoir chamber, which is formed in the housing, for the clutch fluid, and having a supply duct which leads from said reservoir chamber to the working chamber, and having a back-pumping system for returning the clutch fluid from the working chamber to the reservoir chamber with a valve arrangement for controlling the clutch fluid which is supplied to the working chamber being arranged in the supply duct characterized in that the housing is connected to a drive element, is arranged so as to be rotatable relative to a stationary clutch part and forms the primary side of the clutch, with clutch fluid flowing from the reservoir chamber, through the supply duct which runs substantially radially outward from the latter, to the working chamber as the driven housing rotates, in that a radial gap is formed between the housing and the outer edge of the clutch plate, and in that the back-pumping system comprises a scraping element, which is arranged at that side of the clutch plate which faces away from the working chamber, for the clutch fluid, which scraping element has an accumulation edge member and a duct, said duct opening in said accumulation edge member and in communication with the reservoir chamber.

14. The clutch as claimed in claim 13 wherein said scraping element is arranged on the stationary clutch part.

15. The clutch as claimed in claim 13, wherein said housing has a housing body and a cover which engages axially and radially over the clutch plate.

16. The clutch as claimed in claim 13, wherein said drive element for the housing is embodied as a pulley.

17. The clutch as claimed in claim 13, wherein said working chamber is delimited substantially by the profiled regions of the cover and of the clutch plate.

18. The clutch as claimed in claim 13, wherein said stationary clutch part has a flange and a hollow cylindrical part which extends axially from said flange.

* * * * *

UNITED STATES PATENT AND TRADEMARK OFFICE
CERTIFICATE OF CORRECTION

| | | |
|---|---|---|
| PATENT NO. | : 7,954,616 B2 | Page 1 of 1 |
| APPLICATION NO. | : 11/916995 | |
| DATED | : June 7, 2011 | |
| INVENTOR(S) | : Thomas Buchholz | |

It is certified that error appears in the above-identified patent and that said Letters Patent is hereby corrected as shown below:

Column 5, Line 59: "propotional" should read -- proportional --
Column 6, Line 15: "as an oil pump wheel, as an oil pump wheel" should read -- as an oil pump wheel --

Signed and Sealed this
Twenty-eighth Day of February, 2012

David J. Kappos
*Director of the United States Patent and Trademark Office*